United States Patent
Suzuki et al.

(10) Patent No.: US 9,644,082 B2
(45) Date of Patent: May 9, 2017

(54) POLYESTER RESIN COMPOSITION AND MOLDED ARTICLE CONTAINING THIS RESIN COMPOSITION

(71) Applicant: KANEKA CORPORATION, Osaka-shi (JP)

(72) Inventors: Noriyuki Suzuki, Settsu (JP); Tetsuya Minami, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/435,297

(22) PCT Filed: Oct. 10, 2013

(86) PCT No.: PCT/JP2013/006067
§ 371 (c)(1),
(2) Date: Apr. 13, 2015

(87) PCT Pub. No.: WO2014/061243
PCT Pub. Date: Apr. 24, 2014

(65) Prior Publication Data
US 2015/0252186 A1    Sep. 10, 2015

(30) Foreign Application Priority Data

Oct. 15, 2012 (JP) .................................. 2012-227762

(51) Int. Cl.
*C08K 5/053* (2006.01)
*C08L 23/08* (2006.01)
*C08L 67/04* (2006.01)

(52) U.S. Cl.
CPC .......... *C08K 5/053* (2013.01); *C08L 23/0853* (2013.01); *C08L 23/0861* (2013.01); *C08L 67/04* (2013.01); *C08L 2201/06* (2013.01)

(58) Field of Classification Search
CPC ........ C08G 63/06; C08G 63/08; C08K 5/053; C08L 23/0853; C08L 23/0861; C08L 67/04; C08L 2201/06
See application file for complete search history.

(56) References Cited

U.S. PATENT DOCUMENTS 5,726,220 A    3/1998  Tokushige et al.
6,127,512 A *  10/2000 Asrar et al. .................. 528/272

2008/0071018 A1 *  3/2008  Smillie .................. C08L 67/04
                                                              524/437
2012/0149844 A1    6/2012  Whitehouse
2015/0166785 A1    6/2015  Minami et al.

FOREIGN PATENT DOCUMENTS

| EP | 0882765 A2 * | 1/1994 | ............ C08L 67/04 |
| JP | 06-503847 A | 4/1994 | |
| JP | 09-151310 A | 6/1997 | |
| JP | 2007-231184 * | 9/2007 | |
| JP | 2010-504396 A | 2/2010 | |
| JP | 2011-136428 A | 7/2011 | |
| WO | WO 92/01733 A1 | 2/1992 | |
| WO | WO 2008/036334 A2 | 3/2008 | |

OTHER PUBLICATIONS

Yoon, J.S., et al.; Polymer, 1998, p. 2479-2487.*
Kim, M.N., et al.; European Polymer Journal, 1999, p. 1153-1158.*
Bhubalan, K., et al.; Polymer Degradation and Stability, 2008, p. 17-23.*
Doi, Y., et al.; Macromolecules, 1995, p. 4822-4828.*
Scandola, M.; Macromolecules, 1992, p. 4237-4241.*
U.S. Appl. No. 14/439,512, filed Apr. 29, 2015, Suzuki, et al.
U.S. Appl. No. 14/419,414, filed Feb. 3, 2015, Abe, et al.
International Search Report issued Dec. 10, 2013 in PCT/JP2013/006067 filed Oct. 10, 2013.
U.S. Appl. No. 14/767,144, filed Aug. 11, 2015, Minami, et al.
Third Party Observation issued May 2, 2014 in PCT/JP2013/006067.
Communication pursuant to Rule 114(2) EPC issued May 4, 2015 in European Patent Application No. 13847297.2.

* cited by examiner

*Primary Examiner* — Robert Jones, Jr.
(74) *Attorney, Agent, or Firm* — Oblon, McClelland, Maier & Neustadt, L.L.P.

(57) ABSTRACT

An object is to improve both slow crystallization and brittleness that are drawbacks of polyhydroxyalkanoates, so that processability in mold processing, such as injection molding, is improved, processing speed is increased, and ductility is imparted to a resulting molded article. Provided is an aliphatic polyester resin composition including a polyhydroxyalkanoate (A), an ethylene-vinyl acetate copolymer resin (B), and pentaerythritol (C), wherein the ethylene-vinyl acetate copolymer resin (B) has a vinyl acetate content of 65 to 95 wt %, and the polyhydroxyalkanoate (A) and the ethylene-vinyl acetate copolymer resin (B) are compatible.

14 Claims, 2 Drawing Sheets

POLYESTER RESIN COMPOSITION AND MOLDED ARTICLE CONTAINING THIS RESIN COMPOSITION

TECHNICAL FIELD

The present invention relates to a polyester resin composition, and particularly relates to a polyester resin composition intended to allow a biodegradable polyester resin, which is decomposed by the action of microorganisms, to be applied to various industrial materials, and a molded article containing such a polyester resin composition.

BACKGROUND ART

In recent years, biodegradable plastics have been actively developed as materials that can solve problems caused by the heavy burden of plastic waste on the global environment, such as harmful effects on the ecosystem, generation of harmful gas during combustion, and global warming due to a large amount of heat generated by combustion.

Particularly, carbon dioxide generated by combustion of plant-derived biodegradable plastics was originally present in the air. Therefore, combustion of plant-derived biodegradable plastics does not increase the amount of carbon dioxide in the atmosphere. This is referred to as "carbon neutral", and is regarded as important under The Kyoto Protocol that sets targets for reducing carbon dioxide emissions. Therefore, active use of plant-derived biodegradable plastics is desired.

Recently, from the viewpoint of biodegradability and carbon neutral, aliphatic polyester-based resins have received attention as plant-derived plastics. Particularly, polyhydroxyalkanoate (hereinafter, sometimes referred to as PHA)-based resins have received attention. Among PHA-based resins, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins, polylactic acid, etc. have received attention.

However, it is known that such PHA-based resins are hard resins and become brittle with time after mold processing due to their very slow crystallization.

Generally, a plasticizer is added to impart flexibility to a hard resin. This, however, involves a problem that bleeding occurs due to the use of a large amount of plasticizer.

Patent Document 1 discloses, as the technique of imparting good impact strength, blending of a poly(hydroxyalkanoic acid) with an ethylene-vinyl acetate copolymer. This document states that the vinyl acetate content of the ethylene-vinyl acetate copolymer is 6 wt % or more. However, compatibility and improving effect vary depending on the combination of the vinyl acetate content of the ethylene-vinyl acetate copolymer and the type of poly(hydroxyalkanoic acid) used, and therefore impact strength is insufficiently improved.

Patent Document 2 discloses a composition obtained by blending biodegradable P3HB3HV, an ethylene-vinyl acetate copolymer having a vinyl acetate content of 5 to 30 wt %, etc. and states that a certain percentage of the composition has biodegradability, and the elastic modulus or breaking elongation of the composition can be controlled to be in a certain range. However, the copolymer and P3HB3HV are incompatible. Further, in order to impart sufficient ductility to the composition containing P3HB3HV, the ethylene copolymer needs to be blended so as to account for almost half of the total amount of the composition, which reduces biodegradability.

Patent Document 3 discloses a composition containing a lactic acid-based polymer and an ethylene-vinyl acetate copolymer having a vinyl acetate content of 30 to 90 wt %, and states that blocking between the layers of a resulting film can be prevented, and the composition has good breaking elongation. However, satisfactory breaking elongation is not necessarily obtained.

Patent Document 4 discloses a heat-shrinkable laminate film comprising: a layer comprising a resin composition containing a polylactic acid-based resin as a main component and an ethylene-vinyl acetate copolymer-based resin; and a layer comprising a resin composition containing a polylactic acid-based resin, a polyolefin-based resin, and a compatibilizer that improves compatibility between the polylactic acid-based resin and the polyolefin-based resin. This document states that a heat-shrinkable laminate film having excellent ductility can be obtained by laminating at least the above-described two different layers. However, the layer comprising a resin composition containing a polylactic acid-based resin as a main component and an ethylene-vinyl acetate copolymer-based resin cannot necessarily have satisfactory ductility as a film by itself.

On the other hand, the above-described PHA-based resins are slow in crystallization, and therefore require a long cooling time for solidification after heat-melting in mold processing, which causes problems such as poor productivity and temporal change in mechanical properties (especially, toughness such as tensile elongation at break) due to secondary crystallization that occurs after molding.

Therefore, blending of a PHA-based resin with an inorganic material such as boron nitride, titanium oxide, talc, lamellar silicate, calcium carbonate, sodium chloride, or metal phosphate has heretofore been proposed to promote crystallization. However, the blending with an inorganic material has many adverse effects on a resulting molded article, such as reduction in tensile elongation and poor appearance, and is therefore poorly effective.

CITATION LIST

Patent Documents

Patent Document 1: JP-T-2010-504396
Patent Document 2: JP-T-6-503847
Patent Document 3: JP-A-9-151310
Patent Document 4: JP-A-2011-136428

SUMMARY OF INVENTION

Technical Problem

It is an object of the present invention to improve both slow crystallization and brittleness that are drawbacks of biodegradable polyesters, especially polyhydroxyalkanoates, which are decomposed into water and carbon dioxide by the action of microorganisms, so that processability in mold processing, such as injection molding, is improved, processing speed is increased, and ductility is imparted to a resulting molded article.

Solution to Problem

The present inventors have found that both processability and ductility can be achieved by blending a polyhydroxyalkanoate slow in crystallization with an ethylene-vinyl acetate copolymer resin (hereinafter, sometimes referred to as EVA) having a vinyl acetate content of 65 to 95 wt % and pentaerythritol so that the polyhydroxyalkanoate and the ethylene-vinyl acetate copolymer resin are compatible, which has led to the completion of the present invention.

That is, the present invention is directed to an aliphatic polyester resin composition containing a polyhydroxyalkanoate (A), an ethylene-vinyl acetate copolymer resin (B), and pentaerythritol (C), wherein the ethylene-vinyl acetate copolymer resin (B) has a vinyl acetate content of 65 to 95 wt %, and the polyhydroxyalkanoate (A) and the ethylene-vinyl acetate copolymer resin (B) are compatible.

The weight ratio of the polyhydroxyalkanoate (A) to the ethylene-vinyl acetate copolymer resin (B) is preferably 90/10 to 55/45.

The amount of the pentaerythritol (C) contained is preferably 0.05 to 20 parts by weight with respect to 100 parts by weight of the total amount of the polyhydroxyalkanoate (A) and the ethylene-vinyl acetate copolymer resin (B) contained.

The polyhydroxyalkanoate (A) preferably contains a repeating unit represented by the following general formula (1)

[—CHR—CH$_2$—CO—O—]     (1)

(wherein R is an alkyl group represented by C$_n$H$_{2n+1}$ and n is an integer of 1 or more and 15 or less).

The polyhydroxyalkanoate (A) is preferably one or more selected from poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

The present invention is also directed to a polyester resin molded article obtained by molding the aliphatic polyester resin composition.

Advantageous Effects of Invention

The resin composition according to the present invention can improve both the slow crystallization and brittleness of a polyhydroxyalkanoate so that processability in mold processing, such as injection molding, can be improved, processing speed can be increased, and ductility can be imparted to a molded article obtained from the resin composition. Further, the combination of the above-described three components can improve the ductility and flexibility of a molded article, and can further increase the biodegradable component content of the resin composition and/or the biodegradable constituent content of the resin.

DESCRIPTION OF EMBODIMENTS

Hereinbelow, the present invention will be described in more detail.

A polyester resin composition according to the present invention contains a PHA (A), an EVA (B) having a specific vinyl acetate (hereinafter, sometimes referred to as VA) content, and pentaerythritol (C), wherein the PHA (A) and the EVA (B) are compatible.

In the present invention, the PHA (A) is an aliphatic polyester resin containing a repeating unit represented by the general formula: [—CHR—CH$_2$—CO—O—].

The PHA (A) used in the present invention preferably contains a repeating unit represented by the formula (1): [—CHR—CH$_2$—CO—O—] (wherein R is an alkyl group represented by C$_n$H$_{2n+1}$ and n is an integer of 1 or more and 15 or less).

The PHA (A) is preferably a polymer resin containing 80 mol % or more of 3-hydroxybutyrate, more preferably a polymer resin containing 85 mol % or more of 3-hydroxybutyrate. The PHA (A) is preferably produced by a microorganism. Specific examples of the PHA (A) include a poly(3-hydroxybutyrate) homopolymer resin, a poly(3-hydroxybutyrate-co-3-hydroxypropionate) copolymer resin, a poly(3-hydroxybutyrate-co-3-hydroxyvalerate) copolymer resin, a poly(3-hydroxybutyrate-co-3-hydroxyhexanoate) copolymer resin, a poly(3-hydroxybutyrate-co-3-hydroxyheptanoate) copolymer resin, a poly(3-hydroxybutyrate-co-3-hydroxyoctanoate) copolymer resin, a poly(3-hydroxybutyrate-co-3-hydroxynonanoate) copolymer resin, a poly(3-hydroxybutyrate-co-3-hydroxydecanoate) copolymer resin, a poly(3-hydroxybutyrate-co-3-hydroxyundecanoate) copolymer resin, and a poly(3-hydroxybutyrate-co-4-hydroxybutyrate) copolymer resin. Particularly, from the viewpoint of mold processability and the physical properties of a molded article, a poly(3-hydroxybutyrate-co-3-hydroxyvalerate) copolymer resin, a poly(3-hydroxybutyrate-co-3-hydroxyhexanoate) copolymer resin, or a poly(3-hydroxybutyrate-co-4-hydroxybutyrate) copolymer resin is suitable for use as the PHA (A).

From the viewpoint of mold processability and the quality of a molded article, the content ratio of 3-hydroxybutyrate (hereinafter, sometimes referred to as 3HB) to a comonomer copolymerized therewith, such as 3-hydroxyvalerate (hereinafter, sometimes referred to as 3HV), 3-hydroxyhexanoate (hereinafter, sometimes referred to as 3HH), or 4-hydroxybutyrate (hereinafter, sometimes referred to as 4HB), in the PHA (A), that is, the ratio of monomers in a copolymer resin as the PHA (A), is preferably 3-hydroxybutyrate/comonomer=97/3 to 80/20 (mol %/mol %), more preferably 95/5 to 85/15 (mol %/mol %). If the comonomer content is less than 3 mol %, there is a case where a mold processing temperature and a pyrolysis temperature are close to each other, and therefore mold processing is difficult to perform. If the comonomer content exceeds 20 mol %, there is a case where the PHA(A) is slowly crystallized, and therefore productivity is poor.

Each monomer content in a copolymer resin as the PHA (A) can be measured by gas chromatography in the following manner. About 20 mg of the dry PHA is mixed with 2 mL of a sulfuric acid/methanol mixed liquid (15/85 (weight ratio)) and 2 mL of chloroform in a vessel, and the vessel is tightly sealed. Then, the mixture is heated at 100° C. for 140 minutes to obtain a methyl ester of PHA degradation product. After cooling, 1.5 g of sodium hydrogen carbonate is added thereto little by little for neutralization, and the resulting mixture is allowed to stand until generation of carbon dioxide gas is stopped. The mixture is well mixed with 4 mL of diisopropyl ether, and then the monomer unit composition of the PHA degradation product in a supernatant is analyzed by capillary gas chromatography to determine each monomer content in the copolymer resin.

The gas chromatography is performed using "GC-17A" manufactured by SHIMADZU CORPORATION as a gas chromatograph and "NEUTRA BOND-1" (column length: 25 m, column inner diameter: 0.25 mm, liquid film thickness: 0.4 μm) manufactured by GL Sciences Inc. as a capillary column. He gas is used as a carrier gas, a column inlet pressure is set to 100 kPa, and a sample is injected in an amount of 1 μL. As for temperature conditions, the temperature is increased from an initial temperature of 100° C. to 200° C. at a rate of 8° C./min, and is further increased from 200 to 290° C. at a rate of 30° C./min.

In the present invention, the weight-average molecular weight (hereinafter, sometimes referred to as Mw) of the PHA (A) is preferably 200000 to 2500000, more preferably 250000 to 2000000, even more preferably 300000 to 1000000. If the weight-average molecular weight is less than 200000, there is a case where, for example, mechanical properties are poor. If the weight-average molecular weight exceeds 2500000, there is a case where mold processing is difficult to perform.

The weight-average molecular weight can be measured using a gel permeation chromatograph (GPC) ("Shodex GPC-101" manufactured by Showa Denko K.K.), a polystyrene gel column ("Shodex K-804" manufactured by Showa Denko K.K.), and chloroform as a mobile phase, and can be determined as a molecular weight based on a polystyrene calibration curve. In this case, the calibration curve is prepared using polystyrene standards having weight-average molecular weights of 31400, 197000, 668000, and 1920000.

It is to be noted that the PHA (A) is produced by a microorganism such as *Alcaligenes eutrophus* AC32 strain produced by introducing a PHA synthetic enzyme gene derived from *Aeromonas caviae* into *Alcaligenes eutrophus* (International Deposit under Budapest Treaty, International Depository Authority: International Patent Organism Depositary, National Institute of Advanced Science and Technology (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (J. Bacteriol., 179, 4821 (1997)).

The ethylene-vinyl acetate copolymer resin (B) used in the present invention preferably has a VA content of 65 to 95 wt %, more preferably 70 to 90 wt %. If the VA content is less than 65 wt %, there is a case where the EVA (B) is incompatible with the PHA (A), and therefore ductility is not improved. If the vinyl acetate content exceeds 95 wt %, there is a case where ductility cannot be imparted to the PHA (A) unless a relatively large amount of the EVA (B) is blended. It is to be noted that the VA content of the EVA (B) can be determined in accordance with JIS K 7192.

Specific examples of the EVA (B) include "Levapren 650HV" (EVA with a VA content of 65 wt %) manufactured by LANXESS, "Levapren 700HV" (EVA with a VA content of 70 wt %) manufactured by LANXESS, "Levapren 800HV" (EVA with a VA content of 80 wt %) manufactured by LANXESS, "Levapren 900HV" (EVA with a VA content of 90 wt %) manufactured by LANXESS, "Levapren 700XL" (partially-crosslinked EVA with a VA content of 70 wt %) manufactured by LANXESS, "Levapren 800XL" (partially-crosslinked EVA with a VA content of 80 wt %) manufactured by LANXESS, "Levamelt 700" (EVA with a VA content of 70 wt %) manufactured by LANXESS, "Levamelt 800" (EVA with a VA content of 80 wt %) manufactured by LANXESS, and "Soarblen DH" (EVA with a VA content of 70 wt %) manufactured by The Nippon Synthetic Chemical Industry Co., Ltd. At least one of them can be used.

Meanwhile, when polylactic acid as one of polyhydroxyalkanoates is blended with the EVA (B) having a VA content of 90 wt %, the ductility of the polylactic acid/EVA blend is hardly improved. Also when polylactic acid is blended with the EVA (B) having a VA content of 65 wt %, ductility is hardly improved. However, when the PHA (A) having a 3-hydroxybutyrate content of 80 mol % or more is blended with the EVA (B) having a VA content of 65 to 95 wt %, ductility can be improved. That is, ductility cannot be sufficiently improved even by blending polylactic acid with the EVA (B) having a VA content of 65 to 95 wt %, but can be significantly improved by blending the PHA (A) having a 3-hydroxybutyrate content of 80 mol % or more with the EVA (B) having a VA content of 65 to 95 wt %.

The content ratio of the PHA (A) to the EVA (B) in the polyester resin composition is preferably PHA (A)/EVA (B)=90/10 to 55/45 (wt/wt), more preferably 90/10 to 70/30 (wt/wt). If the content ratio exceeds 90/10, there is a case where ductility cannot be imparted to the polyester resin composition. If the content ratio is less than 55/45, there is a case where the mold processability of the polyester resin composition is poor and productivity is reduced.

In the present invention, the compatibility between the PHA (A) and the EVA (B) is determined in the following manner. The polyester composition or a molded article of the polyester composition is stained with $RuO_4$ and observed with a transmission electron microscope ("H-7650" manufactured by Hitachi, Ltd.) at a magnification of 10000 to 40000. When the PHA (A) and the EVA (B) are dispersed to the extent that they cannot be discriminated from each other, this state is regarded as "compatible", and when a dispersion structure is formed in which the PHA (A) forms a continuous phase and the EVA (B) forms a dispersion phase, this state is regarded as "incompatible".

The aliphatic polyester resin composition according to the present invention uses pentaerythritol (C) as a crystal nucleating agent for the polyhydroxyalkanoate (A).

Pentaerythritol is a compound represented by the following formula (2).

[Chemical Formula 1]

(2)

Pentaerythritol is one of polyhydric alcohols and is an organic compound in a white crystal form with a melting point of 260.5° C. The pentaerythritol (C) is classified as a sugar alcohol, but is not derived from a natural product and can be synthesized by condensation of acetaldehyde and formaldehyde in a basic environment.

The pentaerythritol used in the present invention is not particularly limited as long as it is usually commonly available, and may be a reagent or an industrial product.

Examples of the reagent include, but are not limited to, those manufactured by Wako Pure Chemical Industries, Ltd., Sigma-Aldrich, Tokyo Chemical Industry Co., Ltd., and Merck Ltd. Examples of the industrial product include, but are not limited to, those manufactured by KOEI CHEMICAL CO., LTD. (trade name: Pentarit) and TOYO CHEMICALS CO., LTD.

Some of such commonly-available reagents and industrial products contain, as an impurity, an oligomer produced by dehydration condensation of pentaerythritol, such as dipentaerythritol or tripentaerythritol. The oligomer does not have the effect of crystallizing the polyhydroxyalkanoate (A), but does not inhibit the crystallization effect of the pentaerythritol. Therefore, the oligomer may be contained.

The amount of the pentaerythritol (C) used in the present invention is not particularly limited as long as the crystallization of the polyhydroxyalkanoate (A) can be promoted. However, in order to obtain the effect of the pentaerythritol (C) as a crystal nucleating agent, the lower limit of the amount of the pentaerythritol (C) contained is preferably 0.05 parts by weight, more preferably 0.1 parts by weight, even more preferably 0.5 parts by weight with respect to 100 parts by weight of the total amount of the polyhydroxyalkanoate (A) and the ethylene-vinyl acetate copolymer resin (B) contained. If the amount of the pentaerythritol (C) is too large, there is a case where the viscosity of the polyester resin composition during melt processing is reduced, and therefore it is difficult to process the polyester resin composition. Therefore, the upper limit of the amount of the pentaerythritol (C) contained is preferably 20 parts by weight, more preferably 10 parts by weight, even more preferably 8 parts by weight with respect to 100 parts by weight of the total amount of the polyhydroxyalkanoate (A) and the ethylene-vinyl acetate copolymer resin (B) contained.

The polyester resin composition according to the present invention is superior to a polyhydroxyalkanoate itself or a resin composition containing a polyhydroxyalkanoate and a sugar alcohol compound other than the pentaerythritol in that crystallization of the resin composition stably progresses during processing under a wide range of processing conditions, and therefore has the following advantages.

In the case of poly(3-hydroxybutyrate-co-3-hydroxyhexanoate (P3HB3HH) or poly(3-hydroxybutyrate-co-3-hydroxyvalerate (P3HB3HV) as an example of the polyhydroxyalkanoate (A), the progress of its crystallization induced by cooling after heat-melting is influenced by a resin temperature during melting. That is, the crystallization is less likely to progress when a resin temperature during melting is higher. For example, in the case of P3HB3HH, when a resin temperature during melting is in the range of the melting point of the resin to about 170° C., the crystallization of the resin during cooling is less likely to progress when the resin temperature during melting is higher. Further, when the resin temperature during melting is about 180° C. or higher, the crystallization of the resin during cooling tends to progress over several hours. Therefore, in order to successfully perform mold processing, the resin temperature during melting needs to be controlled to be in the range of about 170° C. to 180° C. However, in commonly-performed mold processing, the resin temperature during melting is not uniform, and therefore it is very difficult to control the resin temperature during melting to be in the above range.

The crystallization of the polyester resin composition according to the present invention stably progresses even when a resin temperature during melting is in a wide range. That is, the crystallization of the resin composition quickly progresses with stability even when a resin temperature during melting is in the range of the melting point of the resin to about 190° C., and therefore the resin composition according to the present invention has excellent processing characteristics under a wide range of processing conditions. It is to be noted that from the viewpoint of thermal degradation, it is not preferred that melt processing is performed when the resin temperature during melting is 200° C. or higher.

Further, the progress of crystallization of the polyhydroxyalkanoate depends also on a cooling temperature. For example, in the case of P3HB3HH, its crystallization tends to most progress when a cooling temperature after heat-melting is 50 to 70° C., and its crystallization is less likely to progress when the cooling temperature is lower than 50° C. or higher than 70° C. In commonly-performed mold processing, a mold temperature correlates to the cooling temperature, and therefore needs to be controlled to be in the above temperature range of 50° C. to 70° C. However, in order to uniformly control the mold temperature, the structure or shape of a mold needs to be tightly designed, which is very difficult.

The crystallization of the polyester resin composition according to the present invention stably progresses even when the cooling temperature of the resin after melting is in a wide range. That is, the crystallization of the resin composition quickly progresses with stability even when a cooling temperature after heat-melting is in the range of 20° C. to 80° C., and therefore the resin composition according to the present invention has excellent processing characteristics under a wide range of processing conditions.

The polyester resin composition according to the present invention has the above advantages that cannot be obtained by any conventional polyhydroxyalkanoate resin or resin composition containing a polyhydroxyalkanoate resin and a sugar alcohol compound other than the pentaerythritol (C), which makes it possible to set a resin temperature during melting or a cooling temperature, such as a mold temperature, over a wide range. Therefore, the polyester resin composition has excellent processing characteristics.

The polyester resin composition according to the present invention is quickly crystallized with stability, and therefore exhibits the following characteristics.

For example, in the case of P3HB3HH, its crystallization does not sufficiently progress during molding, and therefore gradually progresses even after molding so that spherulites grow. This tends to gradually embrittle a molded article due to a temporal change in mechanical properties. On the other hand, in the case of the polyester resin composition according to the present invention, a plurality of microcrystals are formed just after molding, and therefore spherulites are less likely to grow after molding. This suppresses embrittlement of a molded article. Therefore, the polyester resin composition is excellent in the quality stability of its product.

Further, there is a gap at a joint between cavities of a mold for injection molding (e.g., parting line portion, insertion portion, slide core sliding portion), and therefore "burr" formed by injecting a molten resin into the gap during injection molding is attached to a molded article. The polyhydroxyalkanoate (A) is slowly crystallized and has flowability for a long period of time. Therefore, burr is easily formed, and post-processing of a molded article requires much effort. However, the polyester resin composition according to the present invention is quickly crystallized, which makes it difficult to form burr. Therefore, effort required for post-processing of a molded article can be reduced, which is preferred from a practical point of view.

The polyester resin composition according to the present invention can be more easily produced by a known melt-kneading machine as long as the machine can heat the polyester resin composition to a temperature equal to or higher than the melting point of the polyhydroxyalkanoate (A) and can knead the polyester resin composition. For example, the polyhydroxyalkanoate (A), the ethylene-vinyl acetate copolymer resin (B), the pentaerythritol (C), and if necessary, another component may be melt-kneaded by an extruder, a roll mill, a Banbury mixer, or the like to form pellets, and then the pellets may be subjected to molding. Alternatively, a previously-prepared masterbatch containing a high concentration of the pentaerythritol may be blended with the polyhydroxyalkanoate (A) and the ethylene-vinyl acetate copolymer resin (B) in a desired ratio, and the resulting mixture may be melt-kneaded and subjected to molding. The pentaerythritol (C), the polyhydroxyalkanoate (A), and the ethylene-vinyl acetate copolymer resin (B) may be added to a kneading machine at the same time. Alternatively, the pentaerythritol (C) may be added after the polyhydroxyalkanoate (A) and the ethylene-vinyl acetate copolymer resin (B) are melted.

In the polyester resin composition according to the present invention, the PHA (A) and the EVA (B) are compatible. Therefore, the polyester resin composition according to the present invention can be easily obtained by melt-kneading the PHA (A) and the EVA (B) at a temperature equal to or higher than the melting point of the PHA (A) or by blending the PHA (A) and the EVA (B) in a solvent, such as chloroform, that can dissolve both the resins. However, from the viewpoint of productivity, the polyester resin composition is preferably produced by melt-kneading.

The polyester resin composition according to the present invention may contain various additives as long as the effects of the present invention are not impaired. Examples of the additives include lubricants, crystal nucleating agents other than the pentaerythritol, plasticizers, hydrolysis inhibitors, antioxidants, releasing agents, ultraviolet absorbers, coloring agents such as dyes and pigments, and inorganic fillers. These additives may be used depending on the intended use, but preferably have biodegradability.

Other examples of the additives include inorganic fibers such as carbon fibers and organic fibers such as human hair and wool. Alternatively, natural fibers may be used, such as bamboo fibers, pulp fibers, kenaf fibers, analogous other plant alternatives, annual herbaceous plants of the genus Hibiscus, family Malvaceae, and annual herbaceous plants of the family Tiliaceae. From the viewpoint of carbon dioxide reduction, plant-derived natural fibers are preferred, and kenaf fibers are particularly preferred.

The following is an example of a method for producing a molded article containing the polyester resin composition according to the present invention.

First, the PHA (A), the EVA (B), the pentaerythritol (C), and if necessary, the above-described various additives are melt-kneaded using an extruder, a kneader, a Banbury mixer, rolls, or the like to prepare a polyester resin composition. Then, the polyester resin composition is extruded into a strand, and the strand is cut to obtain polyester resin composition pellets having a particle shape such as a column shape, an elliptic column shape, a spherical shape, a cubic shape, or a rectangular parallelepiped shape.

In the above-described melt-kneading, the temperature at which the PHA(A), the EVA (B), etc. are melt-kneaded depends on the melting point, melt viscosity, etc. of the PHA (A) used or the melt viscosity etc. of the EVA (B), so that the temperature cannot generally be defined. However, the resin temperature of a melt-kneaded product at a die outlet is preferably 140 to 200° C., more preferably 150 to 195° C., even more preferably 160 to 190° C. If the resin temperature of a melt-kneaded product is less than 140° C., there is a case where the PHA (A) and the EVA (B) are incompatible. If the resin temperature of a melt-kneaded product exceeds 200° C., there is a case where the PHA (A) is thermally decomposed.

The pellets prepared by the above method are sufficiently dried at 40 to 80° C. to remove moisture. Then, the pellets can be mold-processed by a known mold processing method to obtain any molded article. Examples of the mold processing method include film molding, sheet molding, injection molding, blow molding, blow molding, fiber spinning, extrusion foaming, and bead foaming.

Examples of a method for producing a film molded article include T-die extrusion molding, calender molding, roll molding, and inflation molding. However, the film molding method is not limited thereto. The temperature at which film molding is performed is preferably 140 to 190° C. Further, a film obtained from the polyester resin composition according to the present invention can be subjected to heat molding, vacuum molding, or press molding.

Examples of a method for producing an injection-molded article include injection molding methods such as an injection molding method commonly used to mold a thermoplastic resin, a gas assist molding method, and an injection compression molding method. According to the intended use, any injection molding method other than the above methods may be also used, such as an in-mold molding method, a gas press molding method, a two-color molding method, a sandwich molding method, PUSH-PULL, or SCORIM. However, the injection molding methods are not limited thereto. The temperature at which injection molding is performed is preferably 140 to 190° C., and the temperature of a mold is preferably 20 to 80° C., more preferably 30 to 70° C.

The molded article according to the present invention is suitable for use in the fields of agriculture, fishery, forestry, gardening, medicine, sanitary items, food industry, clothing, non-clothing, packaging, automobiles, building materials, etc.

EXAMPLES

Hereinbelow, the present invention will be specifically described with reference to examples, but the technical scope of the present invention is not limited by these examples.

Polyhydroxyalkanoate as raw material A1: Polyhydroxyalkanoate obtained in Production Example 1 was used.

Production Example 1

The culture production of PHA was performed using KNK-005 strain (see U.S. Pat. No. 7,384,766).

The composition of a seed medium was: 1 w/v % Meat-extract, 1 w/v % Bacto-Tryptone, 0.2 w/v % Yeast-extract, 0.9 w/v % $Na_2HPO_4 \cdot 12H_2O$, and 0.15 w/v % $KH_2PO_4$ (pH 6.8).

The composition of a preculture medium was: 1.1 w/v % $Na_2HPO_4 \cdot 12H_2O$, 0.19 w/v % $KH_2PO_4$, 1.29 w/v % $(NH_4)_2SO_4$, 0.1 w/v % $MgSO_4 \cdot 7H_2O$, and 0.5 v/v % trace metal salt solution (prepared by dissolving, in 0.1 N hydrochloric acid, 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$). Palm oil was added at a time as a carbon source at a concentration of 10 g/L.

The composition of a PHA production medium was: 0.385 w/v % $Na_2HPO_4 \cdot 12H_2O$, 0.067 w/v % $KH_2PO_4$, 0.291 w/v % $(NH_4)_2SO_4$, 0.1 w/v % $MgSO_4 \cdot 7H_2O$, 0.5 v/v % trace metal salt solution (prepared by dissolving, in 0.1 N hydrochloric acid, 1.6 w/v % $FeCl_3 \cdot 6H_2O$, 1 w/v %

$CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$), and 0.05 w/v % BIOSPUREX 200K (defoaming agent: manufactured by Cognis Japan Ltd.).

First, a glycerol stock (50 μL) of KNK-005 strain was inoculated into the seed medium (10 mL) and seed-cultured for 24 hours. Then, the resulting seed culture was inoculated at 1.0 v/v % into a 3-liter jar fermenter (MDL-300 manufactured by B. E. MARUBISHI Co., Ltd.) containing 1.8 L of the preculture medium. Preculture was performed for 28 hours under operation conditions where a culture temperature was 33° C., a stirring speed was 500 rpm, and a ventilation volume was 1.8 L/min while pH was controlled to be in the range of 6.7 to 6.8. The pH control was performed using a 14% aqueous ammonium hydroxide solution.

Then, the resulting preculture was inoculated at 1.0 v/v % into a 10-liter jar fermenter (MDS-1000 manufactured by B. E. MARUBISHI Co., Ltd.) containing 6 L of the production medium. Culture was performed under operation conditions where a culture temperature was 28° C., a stirring speed was 400 rpm, and a ventilation volume was 6.0 L/min while pH was controlled to be in the range of 6.7 to 6.8. The pH control was performed using a 14% aqueous ammonium hydroxide solution. Palm oil was used as a carbon source. The culture was performed for 64 hours. After the completion of the culture, cells were collected by centrifugal separation, washed with methanol, and lyophilized to measure the weight of the dried cells.

One-hundred milliliters of chloroform was added to 1 g of the obtained dried cells, and the resulting mixture was stirred at room temperature all day and night to extract PHA from the cells. The mixture was filtered to remove cell debris, and the resulting filtrate was concentrated by an evaporator until its total volume became 30 mL. Then, 90 mL of hexane was gradually added to the filtrate, and the resulting mixture was allowed to stand for 1 hour while being gently stirred. The mixture was filtered to separate the deposited PHA, and the PHA was vacuum-dried at 50° C. for 3 hours. The 3HH content of the obtained PHA was measured by gas chromatography in the following manner. Twenty milligrams of the dried PHA was mixed with 2 mL of a sulfuric acid-methanol mixed liquid (15:85) and 2 mL of chloroform in a vessel, and the vessel was tightly sealed. Then, the resulting mixture was heated at 100° C. for 140 minutes to obtain a methyl ester of PHA degradation product. After cooling, 1.5 g of sodium hydrogen carbonate was added thereto little by little for neutralization, and the resulting mixture was allowed to stand until generation of carbon dioxide gas was stopped. The mixture was well mixed with 4 mL of diisopropyl ether and then centrifuged. Then, the monomer unit composition of the polyester degradation product in a supernatant was analyzed by capillary gas chromatography. The gas chromatography was performed using GC-17A manufactured by SHIMADZU CORPORATION as a gas chromatograph and NEUTRA BOND-1 (column length: 25 m, column inner diameter: 0.25 mm, liquid film thickness: 0.4 μm) manufactured by GL Sciences Inc. as a capillary column. He gas was used as a carrier gas, a column inlet pressure was set to 100 kPa, and a sample was injected in an amount of 1 μL. As for temperature conditions, the temperature was increased from an initial temperature of 100 to 200° C. at a rate of 8° C./min, and was further increased from 200 to 290° C. at a rate of 30° C./min. As a result of the analysis performed under the above conditions, the PHA was found to be poly(3-hydroxybutyrate-co-3-hydroxyhexanoate (P3HB3HH) represented by the chemical formula (1). The 3-hydroxyhexanoate (3HH) content was 5.6 mol %.

After the completion of the culture, PHBH was obtained from the culture by the method described in WO 2010/067543. The PHBH had a weight-average molecular weight Mw of 600000 as measured by GPC.

Polyhydroxyalkanoate as raw material A2: Polyhydroxyalkanoate obtained in Production Example 2 was used.

Production Example 2

A polyhydroxyalkanoate as a raw material A3P3HB3HH, was obtained in the same manner as in Production Example 1 except that KNK-631 strain (see WO 2009/145164) was used instead of KNK-005 strain. The P3HB3HH had a weight-average molecular weight Mw of 620000 and a 3HH content of 7.8 mol %.

Polyhydroxyalkanoate as raw material A3: Polyhydroxyalkanoate obtained in Production Example 3 was used.

Production Example 3

A polyhydroxyalkanoate as a raw material A3, P3HB3HH, was obtained in the same manner as in Production Example 1 except that KNK-631 strain was used and palm kernel oil was used as a carbon source. The P3HB3HH had a weight-average molecular weight Mw of 650000 and a 3HH content of 11.4 mol %.

Polyhydroxyalkanoate as raw material A4: Poly(3-hydroxybutyrate-co-3-hydroxyvalerate) (3-hydroxyvalerate (3HV) content: 5 mol %) manufactured by Sigma-Aldrich was used.

Ethylene-vinyl acetate copolymer resins: The following commercially-available products were used.

EVA-1: "Levapren 900HV" (EVA with a VA content of 90 wt %) manufactured by LANXESS EVA-2: "Levapren 800HV" (EVA with a VA content of 80 wt %) manufactured by LANXESS EVA-3: "Levapren 700HV" (EVA with a VA content of 70 wt %) manufactured by LANXESS EVA-4: "Levapren 600HV" (EVA with a VA content of 60 wt %) manufactured by LANXESS EVA-5: "Evatate K3010" (EVA with a VA content of 28 wt %) manufactured by Sumitomo Chemical Co., Ltd.

Polyvinyl acetate: "SAKNOHOL SN-04T" (VA content: 100 wt %) manufactured by DENKI KAGAKU KOGYO K.K. was used.

Example 1

Production of Polyester Resin Composition

The polyhydroxyalkanoate as a raw material A1, the ethylene-vinyl acetate copolymer resin, and pentaerythritol (manufactured by Wako Pure Chemical Industries Ltd.) were blended in a blending ratio shown in Table 1 (blending ratios shown in the following tables are expressed in part(s) by weight) and melt-kneaded using an co-rotating intermeshing twin screw extruder (TEX30 manufactured by The Japan Steel Works, LTD.) at a preset temperature of 120 to 140° C. and a screw rotation speed of 100 rpm to obtain a polyester resin composition. The temperature of the molten resin discharged from a die was directly measured with a type K thermocouple and defined as a resin temperature. The polyester resin composition was extruded through the die into a strand, and the strand was cut to obtain pellets.

(Injection Molding)

The obtained resin composition was molded into dumbbell specimens in accordance with ASTM D-638 using an injection molding machine (IS-75E manufactured by TOSHIBA MACHINE CO., LTD.) under conditions where the cylinder preset temperature of the molding machine was 120 to 140° C. and the preset temperature of a mold was 50° C. The actual temperature of the mold was measured by bringing a type K thermocouple into contact with the surface of the mold. The thus measured actual temperature of the mold was shown as a mold temperature in the following tables.

(Releasability)

The processability of the polyester resin composition according to the present invention was evaluated in terms of release time. The release time is defined as the time required for a resin injected into a mold to cure so that a resulting specimen can be released from the mold without distortion when the mold is opened and the specimen is ejected by an ejector pin. A shorter release time means that crystallization is faster and mold processability is better or has been improved.

(Tensile Elongation at Break)

The dumbbell specimen obtained by injection molding was subjected to tensile measurement at 23° C. in accordance with ASTM D-638 to measure its tensile elongation at break. The tensile elongation at break is preferably higher.

(Compatibility)

Figure 1:
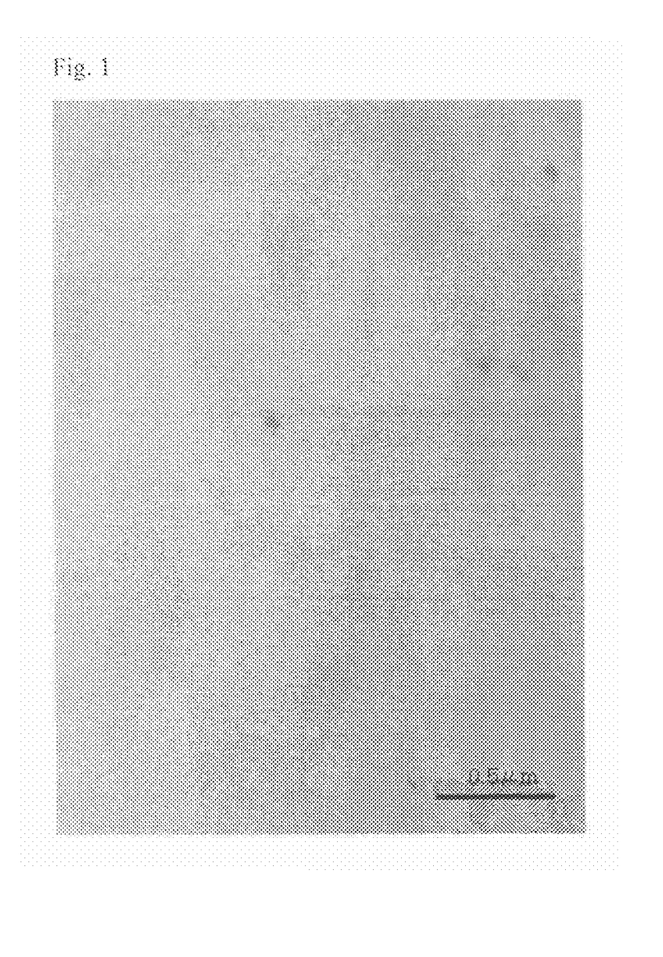
FIG. 1 is a transmission electron micrograph used to determine compatibility between a polyhydroxyalkanoate (PHA) and an ethylene-vinyl acetate copolymer resin (EVA), in which the PHA and the EVA are regarded as being in a "compatible" state where they cannot be discriminated from each other.
Figure 2:
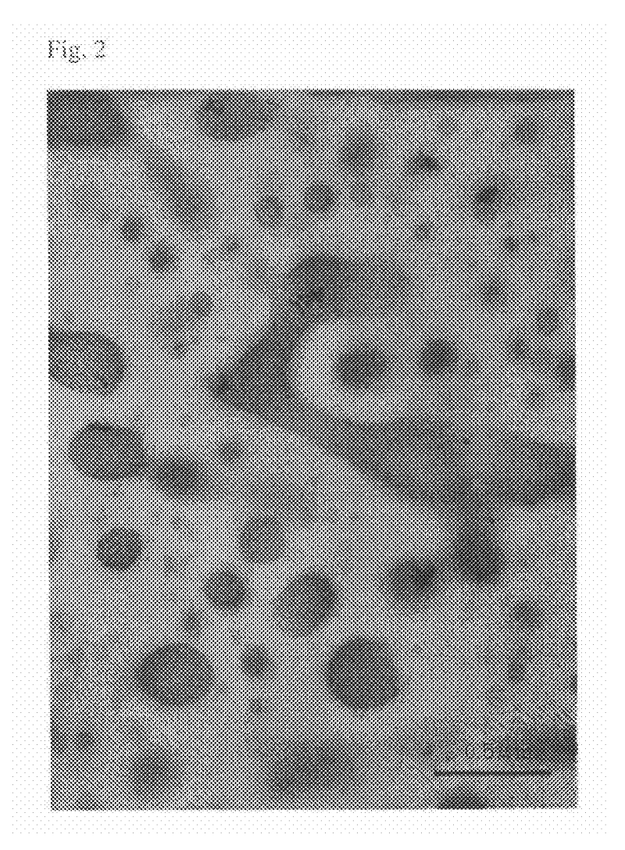
FIG. 2 is a transmission electron micrograph used to determine compatibility between a polyhydroxyalkanoate (PHA) and an ethylene-vinyl acetate copolymer resin (EVA), in which the PHA and the EVA are regarded as being in a "incompatible" state where the PHA forms a continuous phase and the EVA forms a dispersion phase.

The resin composition was stained with $RuO_4$ and observed with a transmission electron microscope ("H-7650" manufactured by Hitachi, Ltd.) at a magnification of 10000 to 40000. When the PHA and the EVA were dispersed to the extent that they could not be discriminated from each other (large black lumps were not observed at all), this state was regarded as "compatible" (FIG. 1), and when a dispersion structure was formed in which the PHA formed a continuous phase and the EVA formed a dispersion phase (observed as large black lumps), this state was regarded as "incompatible" (FIG. 2).

Examples 2 and 3

Pellets of a polyester resin composition were prepared in the same manner as in Example 1 except that the blending ratio was changed as shown in Table 1. Then, the release time was measured during injection molding, the tensile elongation at break of a specimen obtained by injection molding was measured, and the compatibility was determined. The results are shown in Table 1.

Comparative Examples 1 to 5

Pellets of a polyester resin composition were prepared in the same manner as in Example 1 except that the blending ratio was changed as shown in Table 1. Then, the release time was measured during injection molding, the tensile elongation at break of a specimen obtained by injection molding was measured, and the compatibility was determined. The results are shown in Table 1.

TABLE 1

| | | | VA content wt % | Examples | | | Comparative Examples | | | | |
|---|---|---|---|---|---|---|---|---|---|---|---|
| | | | | 1 | 2 | 3 | 1 | 2 | 3 | 4 | 5 |
| Raw materials | Polyhydroxyalkanoate | Raw material A1 | — | 80 | 80 | 80 | 100 | 80 | 80 | 80 | 80 |
| | Ethylene-vinyl acetate copolymer resin | EVA-1 | 90 | 20 | | | | 20 | | | |
| | Ethylene-vinyl acetate copolymer resin | EVA-2 | 80 | | 20 | | | | | | |
| | Ethylene-vinyl acetate copolymer resin | EVA-3 | 70 | | | 20 | | | | | |
| | Ethylene-vinyl acetate copolymer resin | EVA-4 | 60 | | | | | | 20 | | |
| | Ethylene-vinyl acetate copolymer resin | EVA-5 | 28 | | | | | | | 20 | |
| | Polyvinyl acetate | PVAc | 100 | | | | | | | | 20 |
| | Pentaerythritol | — | — | 3 | 3 | 3 | 3 | 0 | 3 | 3 | 3 |
| Melt-kneading | Resin temperature | ° C. | — | 165 | 164 | 165 | 165 | 165 | 165 | 164 | 164 |
| Injection molding | Mold temperature | ° C. | — | 51 | 51 | 52 | 52 | 53 | 52 | 52 | 52 |
| | Release time | sec. | — | 25 | 25 | 25 | 18 | 65 | 25 | 25 | 26 |
| Tensile elongation at break | | % | — | 225 | 210 | 200 | 15 | 230 | 25 | 20 | 9 |
| Compatibility | | — | — | Compatible | Compatible | Compatible | — | Compatible | Incompatible | Incompatible | Compatible |

As shown in Table 1, in Comparative Example 1, the release time of the molded article was as short as 18 seconds, but the tensile elongation at break was as low as 15% for lack of the ethylene-vinyl acetate copolymer resin. In Comparative Example 2, the tensile elongation at break was 230%, but the release time was as long as 65 seconds for lack of the pentaerythritol. In Comparative Examples 3 and 4, the ethylene-vinyl acetate copolymer resin was blended, but the tensile elongation at break was low because the PHA and the EVA were incompatible due to a low VA content of the EVA. In Comparative Example 5, polyvinyl acetate was blended instead of the ethylene-vinyl acetate copolymer resin, but the tensile elongation at break was low. On the other hand, in Examples 1 to 3, the pentaerythritol and the ethylene-vinyl acetate copolymer resin having an appropriate VA content were used in combination. As a result, the release time measured during injection molding was 25 seconds and the tensile elongation at break was 200 to 225%, that is, the polyester resin compositions of Examples 1 to 3 were excellent in both processability and ductility.

Examples 4 to 6

Pellets of a polyester resin composition were prepared in the same manner as in Example 1 except that the blending ratio was changed as shown in Table 2. Then, the release time was measured during injection molding, and the tensile elongation at break of a specimen obtained by injection molding was measured. The results are shown in Table 2.

content were used in combination. As a result, the polyester resin compositions of Examples 4 to 6 were excellent in both processability and ductility.

Examples 7 to 12

Comparative Examples 6 to 11

Pellets of a polyester resin composition were prepared in the same manner as in Example 1 except that the blending ratio was changed as shown in Table 3. Then, the release time was measured during injection molding, and the tensile elongation at break of a specimen obtained by injection molding was measured. The results are shown in Table 3.

TABLE 3

| | | | | Example | | | | | Comparative Example | | | | | |
|---|---|---|---|---|---|---|---|---|---|---|---|---|---|---|---|
| | | | | 7 | 8 | 9 | 10 | 11 | 12 | 6 | 7 | 8 | 9 | 10 | 11 |
| Raw materials | Polyhydroxy-alkanoate | Raw material A2 | | 90 | 80 | | | | | 80 | 100 | | | | |
| | Polyhydroxy-alkanoate | Raw material A3 | | | | 90 | | | | | | 90 | 100 | | |
| | Polyhydroxy-alkanoate | Raw material A4 | | | | | 90 | 80 | 60 | | | | | 80 | 100 |
| | Ethylene-vinyl acetate co-polymer resin | EVA-1 | | 10 | 20 | 10 | 10 | 20 | 40 | 20 | 0 | 10 | 0 | 20 | 0 |
| | Pentaerythritol | — | | 3 | 6 | 7 | 1 | 5 | 7 | 0 | 1 | 0 | 5 | 0 | 1 |
| Melt-kneading | Resin temperature | °C. | | 163 | 162 | 158 | 165 | 164 | 165 | 163 | 162 | 157 | 158 | 165 | 165 |
| Injection molding | Mold temperature | °C. | | 55 | 56 | 61 | 50 | 51 | 52 | 55 | 55 | 61 | 60 | 50 | 50 |
| | Release time | sec. | | 29 | 41 | 49 | 25 | 25 | 30 | 95 | 28 | 153 | 62 | 55 | 15 |
| Tensile elongation at break | | % | | 250 | >400 | 310 | 195 | 263 | 320 | >400 | 17 | >400 | 28 | 267 | 14 |
| Compatibility | | — | | Compatible | Compatible | Compatible | Compatible | Compatible | Compatible | Compatible | — | Compatible | — | Compatible | — |

TABLE 2

| | | | Example | | |
|---|---|---|---|---|---|
| | | | 4 | 5 | 6 |
| Raw materials | Polyhydroxy-alkanoate | Raw material A1 | 90 | 80 | 60 |
| | Ethylene-vinyl acetate co-polymer resin | EVA-1 | 10 | 20 | 40 |
| | Pentaerythritol | — | 5 | 5 | 7 |
| Melt-kneading | Resin temperature | °C. | 165 | 164 | 165 |
| Injection molding | Mold temperature | °C. | 52 | 51 | 52 |
| | Release time | sec. | 15 | 25 | 30 |
| Tensile elongation at break | | % | 209 | 286 | 358 |
| Compatibility | | — | Compatible | Compatible | Compatible |

In Examples 4 to 6, the pentaerythritol and the ethylene-vinyl acetate copolymer resin having an appropriate VA As shown in Table 3, in Comparative Examples 7 9, and 11, the tensile elongation at break was low for lack of the ethylene-vinyl acetate copolymer resin. In Comparative Examples 6, 8, and 10, the release time was longer as compared to Examples 8, 9, and 11, respectively for lack of the pentaerythritol. On the other hand, in Examples 7 to 12, the pentaerythritol and the ethylene-vinyl acetate copolymer resin having an appropriate VA content were used in combination. As a result, the release time measured during injection molding was short, and the tensile elongation at break was high, that is, the polyester resin compositions of Examples 7 to 12 were excellent in both processability and ductility.

The invention claimed is:
1. An aliphatic polyester resin composition comprising:
a polyhydroxyalkanoate (A),
an ethylene-vinyl acetate copolymer resin (B), and
pentaerythritol (C),
wherein the polyhydroxyalkanoate (A) is one or more selected from poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate), the ethylene-vinyl acetate copolymer resin (B) has a vinyl acetate content of 65 to 95 wt %, and the polyhydroxyalkanoate (A) and the ethylene-vinyl acetate copolymer resin (B) are compatible and present in a weight ratio, (A)/(B) of 80/20 to 55/45, and wherein the ratio of 3-hydroxybutyrate/comonomer in said poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate) is 97/3 to 80/20 mol %/mol %.

2. The aliphatic polyester resin composition according to claim 1, wherein the weight ratio of the polyhydroxyalkanoate (A) to the ethylene-vinyl acetate copolymer resin (B) is 60/40 to 55/45.

3. The aliphatic polyester resin composition according to claim 1, wherein an amount of the pentaerythritol (C) present in said composition is 0.05 to 20 parts by weight with respect to 100 parts by weight of a total amount of the polyhydroxyalkanoate (A) and the ethylene-vinyl acetate copolymer resin (B) present in said composition.

4. The aliphatic polyester resin composition according to claim 1, wherein the composition comprises poly(3-hydroxybutyrate-co-3-hydroxyvalerate-co-3-hydroxyhexanoate).

5. A polyester resin molded article obtained by molding the aliphatic polyester resin composition according to claim 1.

6. The aliphatic polyester resin composition according to claim 1, wherein the composition comprises poly(3-hydroxybutyrate-co-3-hydroxyhexanoate).

7. The aliphatic polyester resin composition according to claim 1, wherein the composition comprises poly(3-hydroxybutyrate-co-4-hydroxybutyrate).

8. The aliphatic polyester resin composition according to claim 1, wherein the ratio of 3-hydroxybutyrate/comonomer in said poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate) is 95/5 to 85/15 mol %/mol %.

9. The aliphatic polyester resin composition according to claim 1, wherein the weight-average molecular weight of the polyhydroxyalkanoate (A) is 200,000 to 2,500,000.

10. The aliphatic polyester resin composition according to claim 1, wherein the weight-average molecular weight of the polyhydroxyalkanoate (A) is 300,000 to 1,000,000.

11. The aliphatic polyester resin composition according to claim 1, wherein the amount of pentaerythritol (C) present in said composition is 0.5-10 parts by weight with respect to 100 parts by weight of the total amount of the polyhydroxyalkanoate (A) and the ethylene-vinyl acetate copolymer resin (B) present in said composition.

12. The aliphatic polyester resin composition according to claim 1, wherein:
a weight ratio of the polyhydroxyalkanoate (A) to the ethylene-vinyl acetate copolymer resin (B) is 60/40 to 55/45;
the weight-average molecular weight of the polyhydroxyalkanoate (A) is 200,000 to 2,500,000; and
the amount of pentaerythritol (C) present in said composition is 0.05-20 parts by weight with respect to 100 parts by weight of the total amount of the polyhydroxyalkanoate (A) and the ethylene-vinyl acetate copolymer resin (B) present in said composition.

13. A polyester resin molded article obtained by molding the aliphatic polyester resin composition according to claim 12.

14. The aliphatic polyester resin composition according to claim 1, wherein the amount of said pentaerythritol (C) present in said composition is sufficient to promote the crystallization of said polyhydroxyalkanoate (A).

* * * * *